March 29, 1966 N. L. SIM ETAL 3,243,566
ELECTRIC ARC WELDING CIRCUIT
Filed May 12, 1964
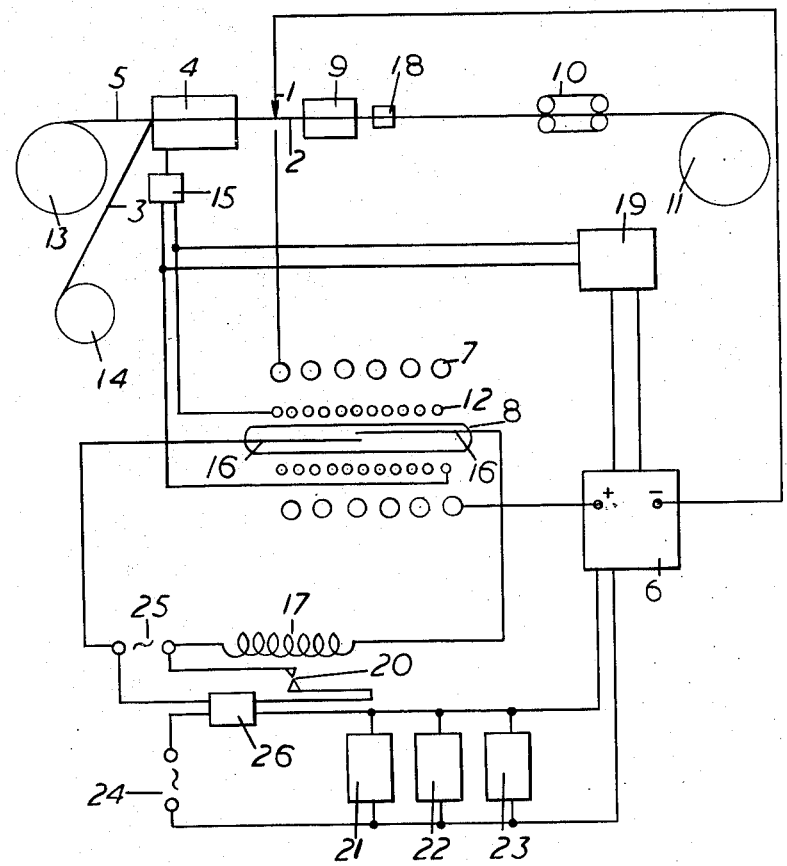
Inventors
NIGEL LOUIS SIM
ANTHONY JOHN MILLARD
By Philip M. Bolton
Attorney

United States Patent Office 3,243,566
Patented Mar. 29, 1966

3,243,566
ELECTRIC ARC WELDING CIRCUIT
Nigel L. Sim and Anthony J. Millard, London, England, assignors to International Standard Electric Corporation, New York, N.Y., a corporation of Delaware
Filed May 12, 1964, Ser. No. 366,777
Claims priority, application Great Britain, July 4, 1963, 26,458/63
4 Claims. (Cl. 219—60)

This invention relates to electric welding circuits.

When for example a tube is being manufactured by electric arc welding together the longitudinal edges of a folded metal strip, the weld may be damaged by too little or too much welding current or by the electrode contacting the folded metal strip; this is particularly undesirable during the welding of a folded copper strip which is to form the inner conductor for a submarine telephone cable wherein a high tensile steel supporting member is enclosed in the folded copper strip. The heat generated by an excessive welding current in this type of submarine telephone cable may also cause loss in the tensile strength of the supporting member or should the supporting member be a steel rope it may even cause some of the steel strands to be severed.

According to the present invention there is provided an electric welding circuit which includes a differential relay having two windings one of which is arranged to be energised by a source of welding potential which feeds a welding device and the other of which is arranged to be energised by a source of potential having a magnitude dependent upon the speed of welding the arrangement being such that the differential relay is actuated to discontinue the welding operation when the welding potential/welding speed ratio changes.

In the accompanying drawing, which illustrates an embodiment of the present invention, there is shown a schematic view of an arc welding circuit for manufacturing an inner conductor for a submarine telephone cable.

Referring to the drawing there is generally shown an argon arc welding device 1 welding a copper tube 2 around a high tensile steel rope 5.

The high tensile steel rope 5 is drawn from a supply drum 13 and copper strip 3 is drawn from a supply reel 14. The copper strip 3 is formed into an oversize copper tube 2 round the steel rope 5 by a forming mill 4 composed of a number of pairs of driven rolls. When the tube 2 has been welded by the welding device 1 it is reduced by a reducing mill 9 and a die 18 to fit tightly round the steel rope 5. A caterpillar 10 draws the tube 2 and steel rope 5 through the reducing mill 9 and die 18 and delivers it to a take-up drum 11. The tube forming mill 4, caterpillar 10 and take-up drum 11 are driven by motors 21, 22 and 23 respectively from a generator 24 which also supplies a power source 6 for feeding power to the welding device 1.

A tacho-generator 15 is coupled to the tube forming mill 4 and has its output connected to a winding 12 wound round a differential reed relay 8. The output from the tacho-generator 15 also feeds the input of a weld current control unit 19 which has its output connected to the power source 6 and controls the magnitude of the welding current passed from the power source 6 to the welding device 1 via a winding 7 round the differential reed relay 8. The winding 7 is coaxial with the winding 12.

The differential reed relay 8 has two ferromagnetic reed contacts 16 which when closed energise a relay 17 from a generator 25. When closed the contacts 20 of the relay 17 cause the generator 25 to actuate a relay 26 which disconnects the motors 21, 22 and 23 and power source 6 from a generator 24.

In operation the generators 24 and 25 are started and the motors 21, 22 and 23 cause the tube forming mill 4, caterpillar 10 and take-up drum 11 to be driven.

When the tube forming mill 4 commences it causes the tacho-generator 15 to energise the weld current control unit 19 which in turn allows the power source 6 to energise the welding device 1 with a current which increases with the speed of the tube forming mill 4. The speed of the strip 3 is dependent upon the speed of the tube forming mill 4 and so by adjusting the weld current control unit 19 the correct welding current for any speed of the strip 3 can be automatically obtained.

The tacho-generator 15 also energises the winding 12 whilst the welding current from the power source 6 energises the winding 7. The windings 7 and 12 are energised to produce magnetic fields of opposite direction and equal intensity when the correct welding current is being fed from the power source 6 to the welding device 1 and so the ferromagnetic reed contacts 16 are not acted upon by a force sufficient to close them when the correct welding current is being supplied to the welding device 1.

Should one of the windings 7 or 12 become energised to produce a magnetic field of a different intensity to the other one by, for example, the welding electrode touching the strip 2 then the ferromagnetic reed contacts 16 will be closed by the resulting magnetic force and cause the contacts 20 of the relay 17 to be closed. When the contacts 20 of relay 17 are closed relay 26 is actuated to disconnect the motors 21, 22 and 23 and power source 6 from the generator 24.

The tacho-generator 15 may be driven by any means whose speed is related to the speed of the strip 3, for example, one of a pair of rollers which are driven by the movement of the strip 3 may drive the tacho-generator 15.

It is to be understood that the following description of specific examples of this invention is not to be considered as a limitation on its scope.

What we claim is:

1. An electric welding circuit which includes a differential relay having two windings one of which is arranged to be energised by a source of welding potential which feeds a welding device and the other of which is arranged to be energised by a source of potential having a magnitude dependent upon the speed of welding, said differential relay further comprising two magnetic reed contacts, said two windings being coaxial around the magnetic reed contacts and energised in opposite directions and equal intensities when the correct welding current is fed to said one winding and the correct welding speed is maintained, and the magnetic reed contacts being actuated to discontinue the welding operation by a resultant force from the magnetic fields produced by energising the windings in unequal intensities, the arrangement being such that the differential relay is actuated to discontinue the welding operation when any change occurs in the welding potential/welding speed ratio to produce said unequal intensities.

2. An electric welding circuit as claimed in claim 1 in which the differential relay contacts are arranged to actuate an electromagnetic relay to discontinue the welding operation.

3. An electric welding circuit as claimed in claim 2 in which the welding device is arranged to weld a tubular submarine cable conductor from strip and the source of potential having a magnitude dependent upon the speed of welding is a generator coupled to a tube forming mill for forming the conductor.

4. An electric welding circuit as claimed in claim 3 in which the electro-magnetic relay is arranged to stop means for moving the strip past a welding device and switch off the source of welding potential to the welding device.

References Cited by the Examiner

UNITED STATES PATENTS

| 1,212,869 | 1/1917 | Woodrow | 219—59 |
| 2,819,369 | 1/1958 | Dexter | 219—8.5 |
| 3,145,285 | 8/1964 | Kohler | 219—59 |

RICHARD M. WOOD, *Primary Examiner.*